United States Patent
Ide

(10) Patent No.: US 7,400,429 B2
(45) Date of Patent: Jul. 15, 2008

(54) IMAGE READING APPARATUS

(75) Inventor: Naoaki Ide, Shizuoka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1011 days.

(21) Appl. No.: 10/388,493

(22) Filed: Mar. 17, 2003

(65) Prior Publication Data

US 2004/0184113 A1    Sep. 23, 2004

(51) Int. Cl.
 *H04N 1/04* (2006.01)
(52) U.S. Cl. .................. 358/475; 358/474; 358/497
(58) Field of Classification Search .......... 358/475, 358/509, 474, 497, 494, 505, 487, 506, 484, 358/483, 482; 359/205; 355/67, 68, 40, 355/41; 250/234–236, 578.1, 227.11, 216; 399/220, 221
See application file for complete search history.

(56) References Cited

U.S. PATENT DOCUMENTS 6,018,410 A * 1/2000 Yamakawa ............... 359/205
6,919,974 B1 * 7/2005 Ichikawa et al. ........... 358/475

FOREIGN PATENT DOCUMENTS

| JP | 60-117557 U | 8/1985 |
| JP | 9-224131 A | 8/1997 |
| JP | 2001-245110 A | 9/2001 |

* cited by examiner

*Primary Examiner*—Cheukfan Lee
(74) *Attorney, Agent, or Firm*—Foley & Lardner LLP

(57) ABSTRACT

An image reading apparatus according to the present invention can obtain an image light from all areas of a document with uniform brightness, when receiving an image light from an area elongate in a first direction, and obtaining image data corresponding to the image information of a document by moving the image light area in a direction orthogonal to the first direction.

5 Claims, 4 Drawing Sheets

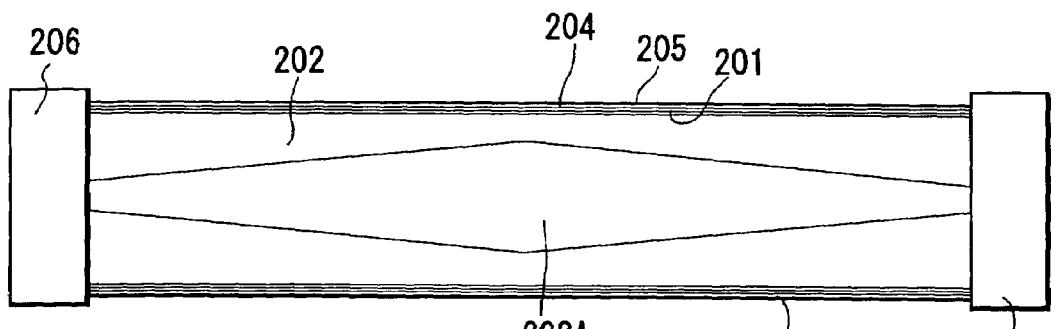
FIG. 3A
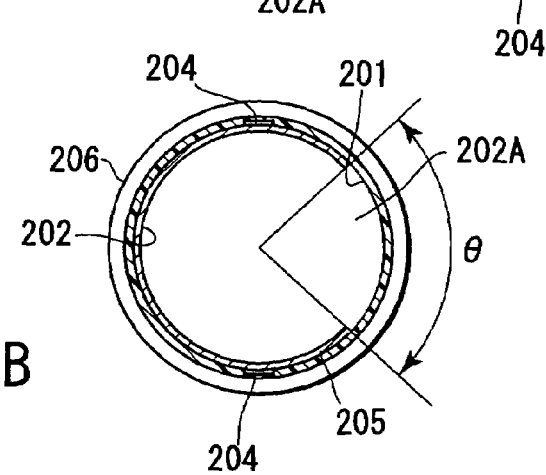
FIG. 3B
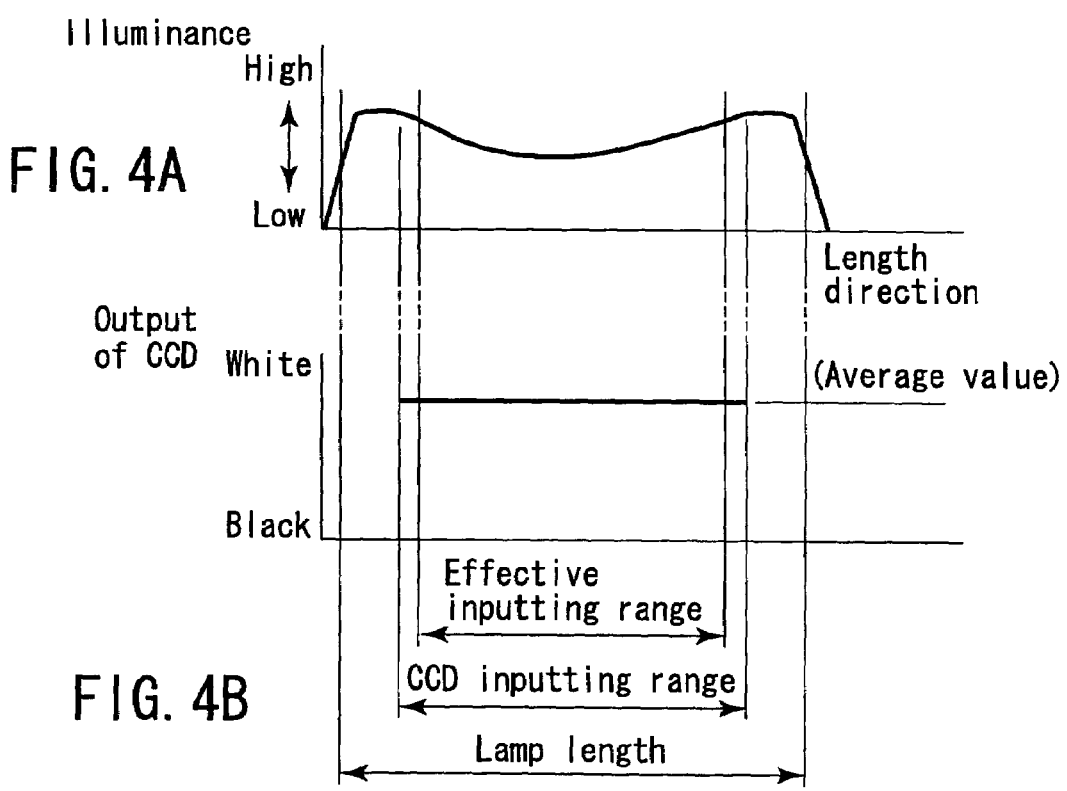
FIG. 4A
FIG. 4B

IMAGE READING APPARATUS

BACKGROUND OF THE INVENTION

The present invention relates to an image reading apparatus which obtains image data from a reading object.

An image scanner obtains image data by opto-electrically converting a reflected light obtained by illuminating a sheet-like document, a book or a three-dimensional reading object, by an image reading sensor.

An image scanner is a transparent glass plate, for example, and includes a document holder (a document table) to hold a reading object placed on a document table, an illumination lamp, an illumination unit to illuminate a reading object placed on a document table, a line CCD sensor or an image reading sensor, and an image forming lens provided between a document table and a CCD sensor, to apply a reflected light from a reading object to a CCD sensor. An image forming lens is a reduction lens to reduce a reflected light of a reading width (length) defined as the length of one side of a document table, to meet the width (length) of the light receiving surface of a CCD sensor. In many cases, in an image scanner, by moving an illumination unit along a reading object fixed on a document table, a reflected light from a reading object is applied to the light receiving surface of a CCD sensor. Thus, an illumination lamp is made tubular long enough to illuminate the width of a reading object.

However, when a reduction lens is used, the intensities of the light passing through the center and periphery of a lens are not constant, and it is known that the light intensity lowers as the light shifts from the lens center, according to the well-known cosine biquadratic law.

Therefore, when a xenon lamp is used as an exposing lamp, for example, the shape of an external electrode is characterized to increase the light intensity in the area shifted away from the lens center. However, even if a xenon lamp with the external electrode shaped as above is used, it is difficult to make the illuminance uniform on the light receiving surface of a CCD sensor. Further, though it is proposed to compensate the influence of the cosine biquadratic law between the lights passing through the center and periphery of a lens when making shading compensation of the opto-electrically converted output from a CCD sensor, it has been know that the S (Signal)/N (Noise) ratio lowers in the light passing through the lens periphery.

Moreover, the characterizing the external electrode shape of a xenon lamp increases the cost of the lamp.

BRIEF SUMMARY OF THE INVENTION

It is an object of the present invention is to increase the dignity of the image data obtained by an image reading sensor, by optimizing the distribution of the light radiated from a lamp of an illumination unit with respect to the length direction of the illumination unit.

The present invention provides an image reading apparatus comprising:

a light-emitting unit which extends in a first direction, and includes a luminous particle formed in a predetermined shape inside;

an opto-electric conversion element which outputs an opto-electric conversion signal corresponding to the light from a reading object illuminated by the light from the light-emitting unit; and an optical element which is provided between the light-emitting unit and the opto-electric conversion element, and guides the light from the reading object to the opto-electric conversion element.

The present invention provides an image reading apparatus comprising:

a discharge lamp which extends in a first direction, has a phosphor provided in a predetermined shape, and radiates light to the outside from an area where the phosphor does not exist;

a carriage mechanism which moves the discharge lamp in a second direction perpendicular to the first direction at a predetermined speed;

an opto-electric conversion element which outputs an opto-electric conversion signal corresponding to the light from a reading object illuminated by the light from the discharge lamp, at every predetermined time when the discharge lamp is moved in the second direction; and a lens element which has the characteristic to suppress the intensity of the light from the reading object at both ends of the first direction, rather than to suppress the intensity of the light from the reading object passing through the center of the first direction, and which is located between the discharge lamp and the opto-electric conversion element, and guides the light from the reading object to the opto-electric conversion element.

Further, the present invention provides an illumination unit comprising:

a tubular glass which extends in a first direction;

a luminous particle which is provided in a predetermined shape in the tubular glass, and can radiate light with a predetermined wavelength when impinged by an electron beam;

an electrode member which can provide an electric field to generate the electron beam; and a window area in which the luminous particle is not formed in the tubular glass.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are schematic illustrations explaining an example of an illumination unit, or a xenon lamp applicable to the image reading apparatus shown in FIGS. 1 and 2;

FIG. 4A is a schematic diagram explaining the light distribution characteristic of the xenon lamp explained in FIGS. 3A and 3B;

FIG. 4B is a schematic diagram explaining the correlation between the light distribution characteristic of the xenon lamp explained in FIG. 4A and the level of the output signal obtained from the CCD sensor of the image reading apparatus shown in FIG. 1;

DETAILED DESCRIPTION OF THE INVENTION

Hereinafter, an example of an image reading apparatus to which an embodiment of the present invention is applicable will be explained with reference to the accompanying drawings.

Figure 1:
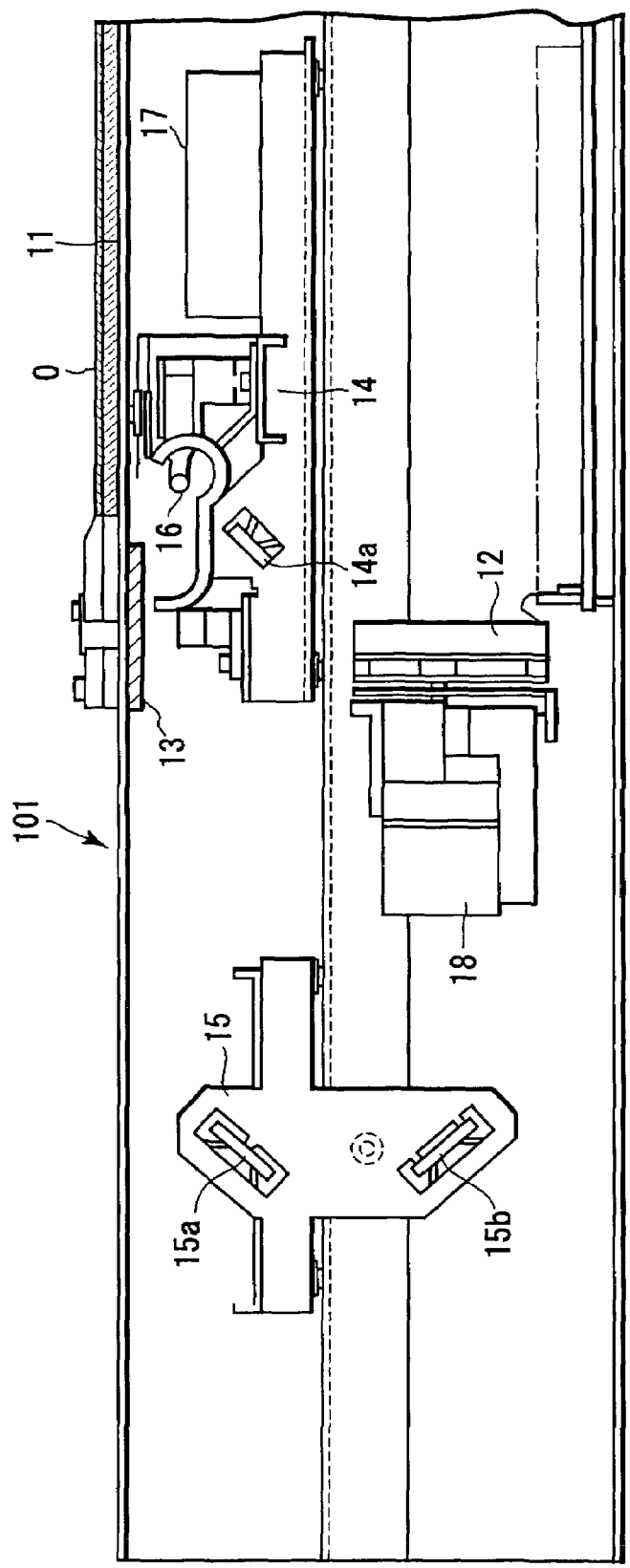
FIG. 1 is a schematic illustration explaining an example of an image reading apparatus to which the present invention is applicable.

As shown in FIG. 1, an image reading apparatus (scanner) 101 has a document table 11 which is a transparent plate-like plain body made of light transmitting material, represented by glass, with the substantially even thickness. The document table 11 holds a copying object O. Hereinafter, the reading object O is called a document, assuming that the reading object O is sheet-like.

At a predetermined position in a scanner 101 below the document table 11, a CCD sensor 12 which converts the image information of the reading object O to an electric signal (image signal) is provided.

At a predetermined position close to one side of the document table 11, a white reference plate 13 used to set a white reference value of the CCD sensor 12 is provided.

In the space below the document table 11, first and second carriages 14 and 15 are provided.

At a predetermined position of the first carriage 14, there are provided an illumination lamp (an exposing unit) 16 which illuminates a reading object O placed on the document table 11, an image light pickup mirror 14a which guides the light reflected from the reading object O illuminated by the illumination light from the illumination lamp 16, or the image light, in a predetermined direction, and a lamp lighting circuit (an exposure control circuit) 17 which lights the illumination lamp 16 to be able to radiate a predetermined intensity light. As the illumination lamp 16, a xenon lamp or a lamp made by applying a phosphor to the inside of a cold cathode-ray tube, can be used.

The second carriage 15 is provided with first and second mirrors 15a and 15b, which guide the image light reflected from the image light pickup mirror 14a toward the CCD sensor 12.

Between the second carriage 15 and the CCD sensor 12, a lens 18, which gives predetermined optical characteristic and image forming magnification to the image light reflected and guided by the second mirror 15b, is provided.

In the vicinity of the CCD sensor 12, there is provided an image processing circuit board 20, which amplifies the opto-electrically converted signal corresponding to the image of the document O outputted from the CCD sensor 12, converts it to a digital signal, and performs a predetermined image processing in the CCD control board 19 for shading correction and for the image signal outputted from the CCD control board 19.

In the above-mentioned scanner 101, the image light from the document O on the document table 11 illuminated by the illumination light from the illumination lamp 16 is caught by the image light pickup mirror 14, reflected sequentially by the first and second mirrors 15a and 15b, and guided to the image forming lens 18. The image light entered the lens 18 is given a predetermined image forming magnification by the lens 18, and applied to form an image to the CCD sensor 12 provided at the focusing position of the lens 18.

In this time, the image light guided to the CCD sensor 12 is like an elongate belt along one side of the document table 11. The first and second carriages 14 and 15 are moved at a predetermined speed in the direction orthogonal to the direction in which the image light extends like a belt, by a wire 20 which transmits the rotation of a motor CM to the carriages 14 and 15, as explained later with reference to FIG. 2. Namely, the position to obtain the belt-like image light along one side of the document table 11 is sequentially moved by moving the first and second carriages 14 and 15. Therefore, by matching the timing (section) of opto-electrically converting the image light by the CCD sensor 12 and the speed of moving the first and second carriages 14 and 15, the image information included in all areas of the document O is opto-electrically converted one by one as image light by the CCD sensor 12. Thus, the image data corresponding to the image information included in all areas of the document O can be obtained.

Figure 2:
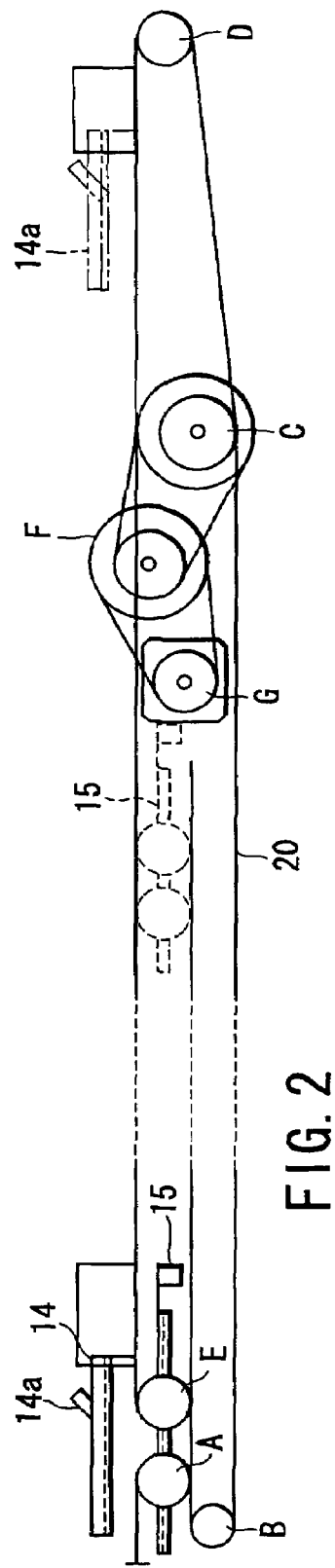
FIG. 2 is a schematic illustration explaining an example of a method of moving an illumination unit of the image reading apparatus shown in FIG. 1.

As shown in FIG. 2, the first and second carriage 14 and 15 are laid over the pulley A of the second carriage 15 from the fixed end of the frame, not described in detail, and reversed in the direction, and again reversed in the direction by the fixed pulley B, and the wound by optional number of turns around the fixed pulley C to which the rotation of the drive motor CM is transmitted, and then reversed further in the direction by the pulley D at the other end, and laid over the pulley E of the second carriage 15. Then, the first carriage 14 is fixed to the wire 21 between the pulley E and pulley D, thereby the motor CM is rotated, and the carriage is moved in a predetermined direction. The second carriage 15 is moved following the first carriage 14, by the distance of ½ of the first carriage 14 at the speed of ½ of the first carriage 14.

FIGS. 3A and 3B are schematic illustrations explaining an example of an illumination unit, or a xenon lamp applicable to the scanner shown in FIGS. 1 and 2.

As shown in FIGS. 3A and 3B, a xenon lamp used as an illumination lamp 16 is a glass tube 201 with the predetermined outer and inner diameters, in which a phosphor 202, or a luminous body is applied to the inside surface, and rare gas, for example, xenon gas 203 is sealed in by a predetermined pressure. The phosphor 202 is eliminated in a predetermined range in the light emitting side, to emit the light emitted from the phosphor 202 to the outside of the lamp. Namely, a window 202A is formed in a predetermined area of the phosphor 202.

In the outside of the glass tube 201, a pair of external electrodes 204 is provided holding the area where the phosphor 202 is eliminated. An insulation tube 205 protecting the glass tube 201 is provided, covering the outer circumference of the external electrode. A holder 206 is formed at both ends of the glass tube 201.

A predetermined pulse voltage from the lamp lighting circuit 17 is applied to the external electrode 204.

When a predetermined voltage is applied to the external electrode 204, the electron in the glass tube 201 is attracted and moved by an electric field, causing an electric discharge.

The electron generated by the electric discharge impinges on the electron of the rare gas 203 in the glass tube 201, generating ultraviolet rays.

The ultraviolet rays generated as described above impinge on the phosphor 202, generating an illumination light that is a visible light including a phosphor, or a predetermined wavelength. The illumination light is radiated to the outside through the above-mentioned window 202A.

The window 202A varies in the opening angle θ along the length of the glass tube 201. The opening angle θ is the widest at the center of the length of the glass tube 201. By adjusting the opening angle θ, the light distribution in the length direction of the lamp 16 can be adjusted.

The window 202A is formed by eliminating the phosphor 202 formed with a predetermined thickness in the glass tube 201, by scraping off, for example. When the phosphor 202 is formed in the glass tube 201, it is allowed to use a mask-like phosphor area control member with the shape of the window 202A, for example.

As a lamp 16, not only a xenon lamp, but also all lamps constructed to have a phosphor in a glass tube can be used.

FIGS. 4A and 4B are schematic diagrams explaining the light distribution characteristic of the xenon lamp explained in FIGS. 3A and 3B, and the correlation between the light distribution characteristic and the output signal level obtained from the CCD sensor of the scanner shown in FIG. 1, respectively.

As shown in FIG. 4A, the illumination lamp 16 has the light distribution that is set to have the peak in the quantity of light at a position close to both ends of the length direction of the light emitted through the window 202A (refer to FIGS. 3 and 3B), and the minimum at a position substantially the center in the length direction.

By being set to the minimum quantity of light at a position substantially the center in the length direction, the illumination lamp obtains the substantially flat characteristic not influenced by the light distribution characteristic (cosine biquadratic law) given by using the image forming lens 18.

The light distribution characteristic shown in FIG. 4A is given by optimizing the size and shape of the window 202A explained with reference to FIGS. 3A and 3B. Namely, as the feature of the shape of the window 202A formed by partially eliminating the phosphor 202, the quantity of light becomes the maximum at the center in the length direction of the lamp 16 or in the area close to the center where the phosphor 202 is eliminated. However, as the quantity of light radiated from the lamp to the outside, a predetermined quantity of light can be ensured by diffraction of the light generated at the end or close to the end in the length direction, and scattering and diffusion in the glass tube.

FIG. 4B shows the output level of the CCD sensor 12, obtained as a result of forming an image by the lens 18 by applying the light, or the illumination light from the lamp 16 with the light distribution characteristic shown in FIG. 4A, to the light receiving surface of the CCD sensor 12. FIG. 4B shows the output of the CCD sensor 12 obtained by illuminating the white reference plate 13.

As shown in FIG. 4B, the illumination light emitted through the window of the shape shown in FIGS. 3A and 3B (refer to FIG. 4A) is overlapped with the influence of the cosine biquadratic law peculiar to the lens 18, and formed an image with the substantially uniform light distribution characteristic, on the light receiving surface (light inputting range) of CCD sensor 12. Further, since the quantity of light lowers by structure at the end of the lamp as the light-emitting characteristic peculiar to the lamp 16, it is needless to say that the length of the lamp 16 is usually set longer than the reading (inputting) range in the CCD sensor 12. The effective reading range is set more close to the center than the reading range in the CCD sensor 12, to make the errors in the position of mounting the CCD sensor 12 and lamp 16 permissible. The shape of the phosphor 202, or the size and shape of the window 202A are set, so that the deviation of the illumination light in the reading range in the CCD sensor 12 is 20% maximum, preferably 10% or lower.

Figure 5:
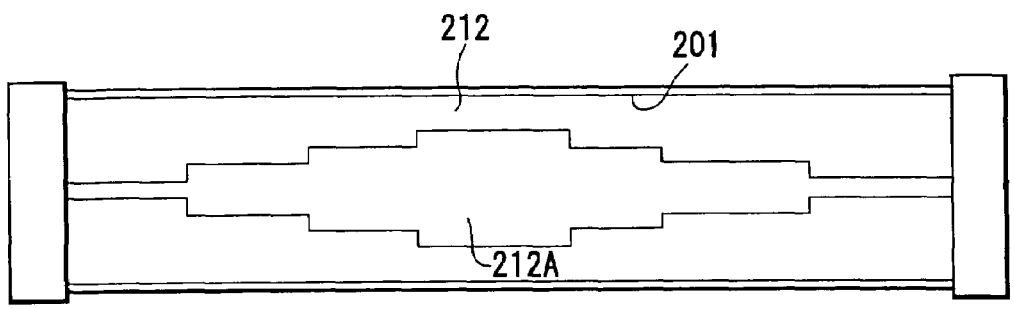
FIG. 5 is a schematic diagram explaining another example of the shape of the lamp window explained in FIGS. 3A and 3B.
Figure 6:
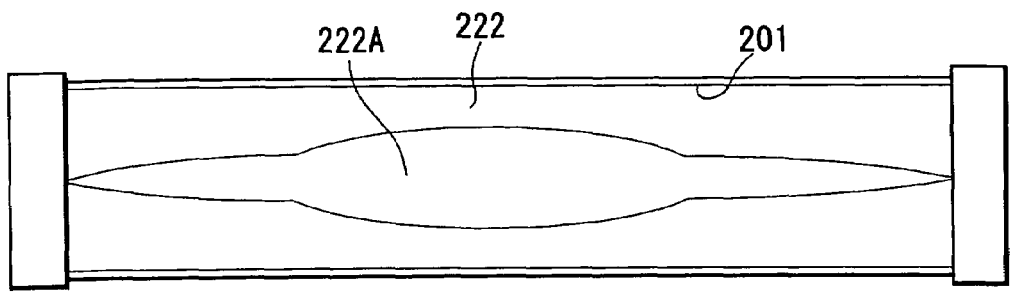
FIG. 6 is a schematic diagram explaining another example of the shape of the lamp window explained in FIGS. 3A and 3B.

FIGS. 5 and 6 explain another embodiment of the lamp window shape explained with reference to FIGS. 3A and 3B.

As seen easily from the above explanation with reference to FIGS. 3A, 3B and FIGS. 4A, 4B, the shape of the area where the window of the illumination lamp 16, or the phosphor is eliminated is, as explained in FIG. 4B, such that the output signal level from the CCD sensor 12 is substantially uniform in all areas in the length of the illumination lamp 16.

For example, as shown in FIG. 5, the shape of the window 212A (10 is added to the reference numeral to discriminate from the above-mentioned windows) may be such that the phosphor 212 is eliminated to be parallel to the axis of the glass tube 201 of the illumination lamp 16, and seems to be multiple linear notches with different width piled up.

Further, as shown in FIG. 6, the shape of the window 222A (20 is added to the reference numeral to discriminate from the above-mentioned windows) may be such that the phosphor 222 is eliminated to be the shape defined by a curve or combination of multiple curves defined to have the maximum width at the center in the length of the glass tube 201 of the illumination lamp 16.

Figure 7A:
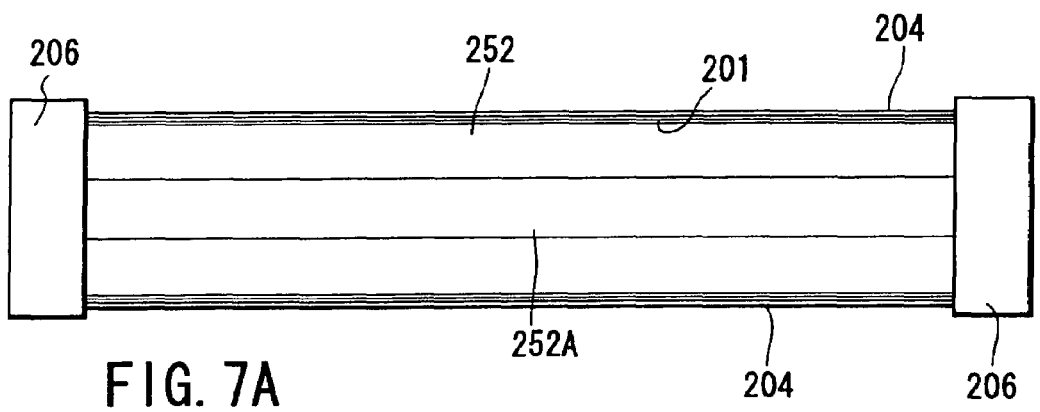
FIGS. 7A to 7C are schematic diagrams explaining an example of a xenon lamp different from the xenon lamp explained in FIGS. 3A and 3B, and FIGS. 5 and 6.
Figure 7B:
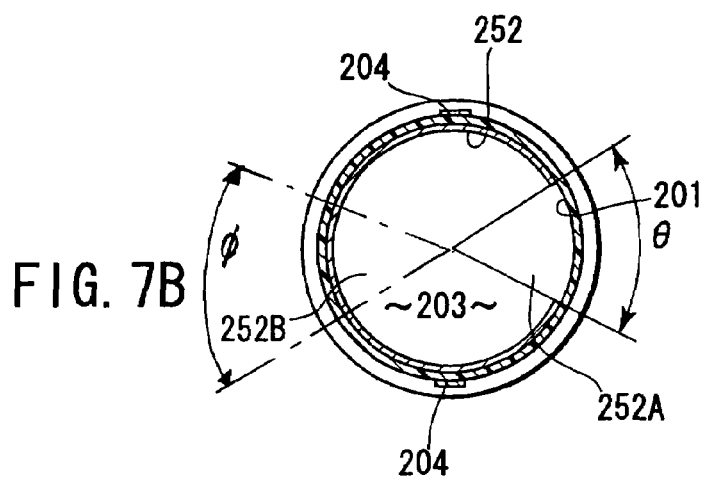
Figure 7C:
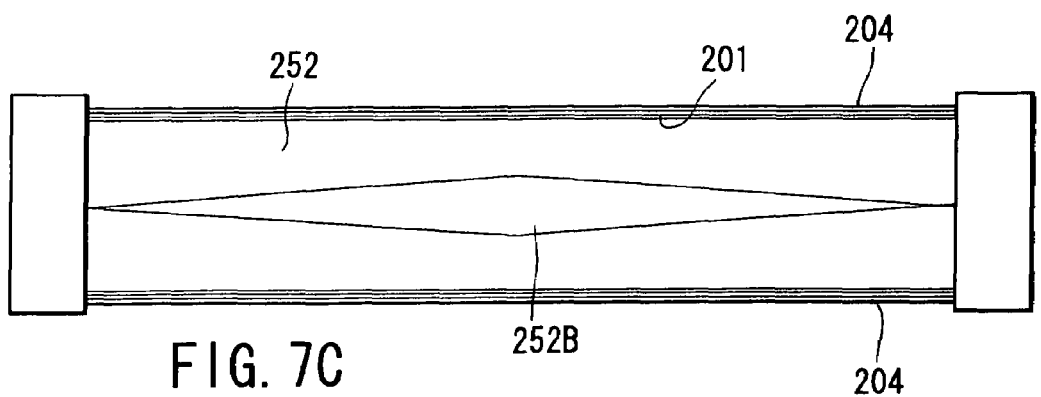

FIGS. 7A, 7B and 7C explain another embodiment of the illumination lamp explained with reference to FIGS. 3A and 3B. The same reference numerals are given to the same components of the configuration shown in FIGS. 3A and 3B, and the detailed explanation will be omitted.

As shown in FIGS. 7A to 7C, a xenon lamp used as an illumination lamp 16 is a glass tube 201 in which a phosphor 252 is applied to the inside surface, and xenon gas 203, for example, is sealed in by a predetermined pressure. The phosphor 252 is eliminated in a predetermined range in the light emitting side, to emit the light emitted from the phosphor 252 to the outside of the lamp. Namely, windows 252A and 252B are formed in predetermined areas of the phosphor 252. The window 252B sown in FIG. 7C is, as seen from FIG. 7B, located in the opposite side to the window 252A in the glass tube 201.

The window 252A is formed with the substantially equal width (the opening angle θ is constant) in all areas of the length direction of the glass tube 201.

On the other hand, the window 252B varies in the opening angle φ (the opening width) along the length direction of the glass tube 201. The opening width of the window 252B is made the widest at the center in the length direction of the glass tube 201. Therefore, by adjusting the opening width, the light distribution in the length direction of the lamp 16 can be optimized.

Figure 8:
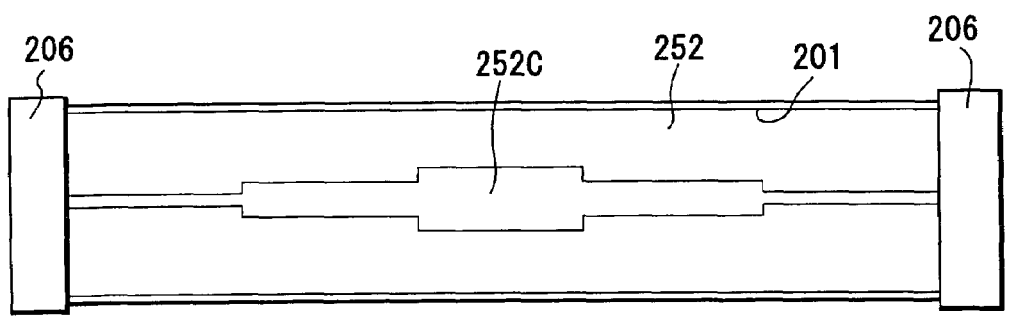
FIG. 8 is a schematic diagram explaining another example of the shape at the rear of the lamp window explained in FIGS. 7A to 7C.
Figure 9:
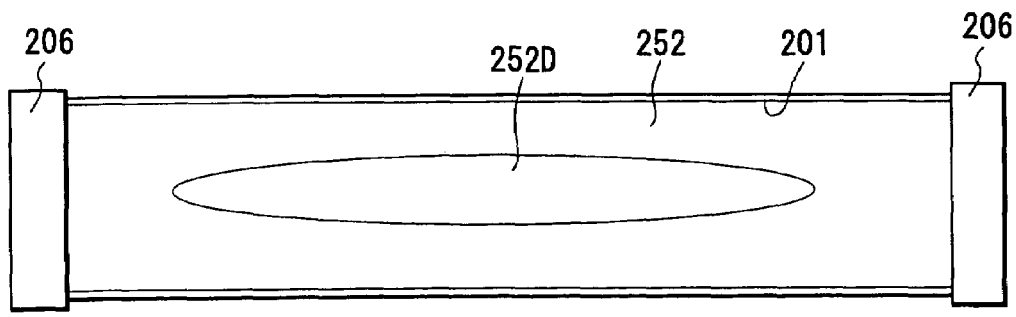
FIG. 9 is a schematic diagram explaining another example of the shape at the rear of the lamp window explained in FIGS. 7A to 7C.

FIGS. 8 and 9 explains another embodiment of the lamp window shape explained with reference to FIGS. 7A to 7C. For example, as shown in FIG. 8, the shape of the window 252C (a subscript of a reference numeral is changed to discriminate from the above-mentioned windows) provided in the opposite side of the window 252A (refer to FIG. 7A) may be such that the phosphor 252 is eliminated to be parallel to the axis of the glass tube 201 of the illumination lamp 16, and seems to be multiple linear notches with different width piled up. Further, as shown in FIG. 9, the shape of the window 252D (a subscript of a reference numeral is changed to discriminate from the above-mentioned windows) provided in the opposite side of the window 252A (refer to FIG. 7A) may be such that the phosphor 252 is eliminated to have the shape defined by a curve or combination of multiple curves defined to have the maximum width at the center of the length.

As explained hereinbefore, according to the present invention, is possible to obtain an illumination light capable of providing uniform illuminance in all areas of the light receiving surface of CCD sensor, or an opto-electrical conversion element, in an image reading apparatus which obtains image data by opto-electrically converting a reflected light obtained by illuminating a reading object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
   a light-emitting unit which extends in a first direction, and includes a luminous particle area formed in a predetermined shape with a non-luminous particle area inside, and which moves at a predetermined speed in a second direction perpendicular to the first direction, and which outputs light whose intensity is greatest in a center in the first direction of the light-emitting unit and continuously varies from the center in the first direction to both ends;
   an opto-electric conversion element which outputs an opto-electric conversion signal corresponding to the light from an object illuminated by the light from the light-emitting unit and which converts the light from the object at every predetermined time when the light-emitting unit moves in the second direction; and
   an optical element which is provided between the light-emitting unit and the opto-electric conversion element, and guides the light from the object to the opto-electric conversion element,
   wherein the optical element has the characteristic to suppress the intensity of the light from the object at both ends of the first direction, rather than to suppress the intensity of the light from the object passing through the center in the first direction.

2. An image reading apparatus comprising:
   a light-emitting unit which extends in a first direction, and includes a luminous particle area formed in a predetermined shape with a non-luminous particle area inside, and which moves at a predetermined speed in a second direction perpendicular to the first direction, and which outputs light whose intensity is greatest in a center in the first direction of the light-emitting unit and continuously varies from the center in the first direction to both ends;
   an opto-electric conversion element which outputs an opto-electric conversion signal corresponding to the light from an object illuminated by the light from the light-emitting unit and which converts the light from the object at every predetermined time when the light-emitting unit moves in the second direction; and
   an optical element which is provided between the light-emitting unit and the opto-electric conversion element, and guides the light from the object to the opto-electric conversion element,
   wherein the optical element has the characteristic to suppress the intensity of the light from the object at both ends of the first direction, rather than to suppress the intensity of the light from the object passing through the center in the first direction,
   wherein the light-emitting unit outputs the light to the outside from the non-luminous particle area in which the luminous particle is not provided, and the luminous particle is formed in a shape so that the deviation of the intensity of the light from the object reaching the opto-electric conversion element is set to be within a predetermined range in all areas in the first direction by the characteristic of the optical element.

3. The image reading apparatus according to claim 2, wherein the non-luminous particle area is formed by eliminating the luminous particle.

4. An image reading apparatus comprising:
   a discharge lamp which extends in a first direction, has a phosphor provided in a predetermined shape, and radiates light to the outside from a window area which outputs the light from the area where the phosphor does not exist, to the outside, by selectively providing the phosphor in a predetermined area in a glass tube which transmits the light from the phosphor, the window area having a shape which maximizes intensity of light from a center in the first direction and continuously changes the intensity from the center in the first direction to both ends;
   a carriage mechanism which moves the discharge lamp in a second direction perpendicular to the first direction at a predetermined speed;
   an opto-electric conversion element which outputs an opto-electric conversion signal corresponding to the light from an object illuminated by the light from the discharge lamp, at every predetermined time when the discharge lamp is moved in the second direction; and
   a lens element which has the characteristic to suppress the intensity of the light from the object at both ends of the first direction, rather than to suppress the intensity of the light from the object passing through the center of the first direction, and which is located between the discharge lamp and the opto-electric conversion element, and guides the light from the object to the opto-electric conversion element.

5. The image reading apparatus according to claim 4, wherein the phosphor of the discharge lamp is formed in a shape so that the deviation of the intensity of the light from the object reaching the opto-electric conversion element is set to be within a predetermined range in all areas in the first direction by the characteristic of the lens element.

* * * * *